(12) United States Patent
Pospiel (10) Patent No.: US 9,998,894 B2
(45) Date of Patent: Jun. 12, 2018

(54) AUTO-GENERATE EMERGENCY VOICE CALL BASED ON SENSOR RESPONSE AND PRE-ENTERED DATA

(71) Applicant: Gregory Pospiel, Woodland Park, NJ (US)

(72) Inventor: Gregory Pospiel, Woodland Park, NJ (US)

(*) Notice: Subject to any disclaimer, the term of this patent is extended or adjusted under 35 U.S.C. 154(b) by 0 days. days.

(21) Appl. No.: 15/463,027

(22) Filed: Mar. 20, 2017

(65) Prior Publication Data

US 2017/0295481 A1 Oct. 12, 2017

Related U.S. Application Data

(60) Provisional application No. 62/320,958, filed on Apr. 11, 2016.

(51) Int. Cl.
*H04M 11/04* (2006.01)
*H04W 4/22* (2009.01)
*H04W 4/02* (2018.01)

(52) U.S. Cl.
CPC ............... *H04W 4/22* (2013.01); *H04W 4/02* (2013.01)

(58) Field of Classification Search
CPC .. G08B 19/005; G08B 25/008; G08B 27/003; G08B 29/185; G08B 25/002; G08B 25/006; G08B 27/005; G08B 3/10; G08B 15/004; G08B 21/0453; G08B 25/009; G08B 25/016; G08B 25/10; G08B 27/00; G08B 6/00; G08B 17/10; G08B 13/1672; G08B 13/19602; G08B 13/19656; G08B 25/08; G08B 19/00; G08B 5/36; H04L 12/2816; H04L 67/12; H04L 12/282; H04L 12/2829; H04L 63/08; H04L 2012/285; H04L 12/2803; H04L 2012/2841; H04L 12/2827; H04L 43/10; H04W 4/008; H04W 4/021; H04W 4/02; H04W 4/043; H04W 24/00
See application file for complete search history.

(56) References Cited

U.S. PATENT DOCUMENTS

| | | | |
|---|---|---|---|
| 6,269,246 B1* | 7/2001 | Rao | G01S 5/0252 455/186.1 |
| 2008/0046134 A1* | 2/2008 | Bruce | G01C 21/005 701/1 |
| 2010/0003958 A1* | 1/2010 | Ray | G10L 13/043 455/404.2 |
| 2012/0264446 A1* | 10/2012 | Xie | G01C 22/00 455/456.1 |
| 2015/0061859 A1* | 3/2015 | Matsuoka | G08B 27/00 340/501 |
| 2016/0337828 A1* | 11/2016 | Michaelis | H04W 4/22 |
| 2017/0126834 A1* | 5/2017 | Fransen | H04L 67/303 |

\* cited by examiner

*Primary Examiner* — Nimesh Patel
(74) *Attorney, Agent, or Firm* — Michael J. Feigin, Esq.; Feigin and Fridman (57) ABSTRACT

An emergency call system which generates audio for the emergency call which is played to an emergency responder, is disclosed. The audio is generated based on a combination of data entered into a system prior to the emergency, and data entered into the system during the emergency. Such data is entered by way of sensors or user input and the data which is used during the emergency call depends on the type of call. Devices which can gather the data include bidirectional battery powered transceivers and base stations which have phone network connectivity.

17 Claims, 4 Drawing Sheets

AUTO-GENERATE EMERGENCY VOICE CALL BASED ON SENSOR RESPONSE AND PRE-ENTERED DATA

FIELD OF THE DISCLOSED TECHNOLOGY

The disclosed technology relates generally to emergency calls, and more specifically to a method of generating audio in an emergency call based on emergency data.

BACKGROUND OF THE DISCLOSED TECHNOLOGY

Not all burglaries are conducted by individuals who seek to steal the victims' expensive jewelry or high-priced electronics without incident; home invasions are often only predications for other violent crimes such as murder, rape, kidnapping, property crimes, etc. According to the Bureau of Justice Statistics National Crime Victimization Survey dated September 2010, an estimated 3.7 million household burglaries occurred each year between 2003 and 2007. A household member was present in approximately 1 million of these burglaries and became a victim of violent crimes in 266,560 of these events. This pivotal study also revealed that households composed of single females with children had the highest rates of burglary while someone was present.

For most, the thought of being the victim of a crime is daunting enough but to think that an individual or group of individuals would violate the sanctity of the person's or family's own home adds another level of intimacy and seriousness to the issue. Further complicating matters, according to The Wall Street Journal article dated Aug. 2, 2013, *"Giving No Time to Misleading Police Stats"*, the national average response time for emergency calls is 11 minutes. As a result, many have opted to take the protection of their families into their own hands by purchasing home security systems; high-tech devices such as WI-FI operated cameras; large dogs; or even dangerous firearms to obtain a sense of protection for themselves and their families.

According to US News, Americans spent $20.64 billion on home security systems in 2011 alone and the industry expects to grow by $34.46 billion by 2017. Even for traditionalists, the average annual cost of a large dog is approximately $1,843 or the purchase a firearm can be several hundred including taking on the inherent responsibility and risk of owning a dangerous weapon or animal. Most home security companies offer installation specials as low as $99 but start-up and equipment costs can range between $600.00 and $1,200.00. Because most of these systems are forced to rely on standard landlines and traditional remote monitoring service (someone far away to respond to the alarm wherein "remote" is defined as off-site from the present location, e.g. a different address), customers may incur monthly fees. These fees can cost up to hundreds of dollars per month and include fees for monitoring, maintenance, and other incidentals. Additionally, these services are usually bound by costly and lengthy contracts. Further, to try and circumvent some of the weaknesses of traditional home security systems such as an individual simply cutting telephone lines or bad weather inhibiting call activity, many customers opt for a better connection such as a cellular connection to the alarm company. This "extra" generally adds additional significant equipment, installation and contract costs and imposes the monthly fees of a cell phone, making the use of cellular technology in these systems even more expensive.

Home invasions and burglaries aren't the only problem where emergency response can dictate life and death. According to statistics produced by the National Fire Protection Association in 2013, fire departments responded to 1,240,000 fires resulting in: 3,240 deaths, 15,925 injuries and 11.5 billion dollars in direct property loss. This same entity reported that during 2006-2010 municipal fire departments responded to an annual average of 72,000 carbon monoxide incidents, excluding all incidents where either nothing was found or fire was present. These carbon monoxide incidents result in about 70 deaths per year on average.

Additionally, The National Council on Aging reports that falls are the leading cause of both fatal and nonfatal injuries among older Americans and indicates that one-third of Americans aged 65+ fall each year. In 2013, 2.5 million nonfatal falls among older adults were treated in emergency departments and more than 734,000 of these patients were hospitalized. According to the New York Daily News, the average EMS response was over nine minutes. The direct medical cost of falls was $34 billion in 2013 as reported by the Centers for Disease Control.

According to the Centers for Disease Control, there are 136.3 million emergency room visits per year, including 19.6 million visits by individuals aged 65 and older during 2009-2010. Devices allowing elderly, disabled people or individuals with high risk of a medical emergency to contact first responders do exist but are generally costly, and require expensive equipment, contracts and monthly monitoring fees. They also are typically bound by human monitoring and lengthy chains of communication to reach emergency services who only then, begin the process of dispatching emergency medical professionals.

While there have been a wide array of inventions in the field of home security such as traditional home security systems with remote monitoring, collections of networked cameras, motion detectors, etc. and advancements such as wireless technology and smart-phone controlled devices; these systems lack the ability to automatically summon emergency help and add layers of possible technical malfunction and human error. The cost-prohibitive nature of many existing systems also likely forces many families and businesses to secure only a limited number of windows, doors or rooms in order to reduce cost, thus reducing their protection. This leaves less accessed doors and windows (other frequently used access points during home invasions) unarmed and vulnerable. In fact, according to Household Tips, 67% of burglars gain access to the home through an area other than the front door.

Even when families do invest in such costly systems to secure their entire home; in the event of a home invasion, fire, carbon monoxide or medical emergency—whether these systems rely on landline or "extra" cellular connection, this process usually involves the following, time-consuming steps:

1. A delay
2. Sending an electronic signal to the monitoring service, usually at a far-off location;
3. Employee of the monitoring company responds to the signal by calling the user/homeowner to ascertain whether they are safe or not for the signal received for medical emergency, fire, carbon monoxide, or burglary
4. After obtaining information from the home or business owners, if they were able to be reached and are able to speak, the employee then identifies which police and/or fire department to call in the customer's area;

5. This employee calls the police and/or fire department and notifies emergency personnel of the situation they gathered from the customer to dispatchers;

6. Dispatcher at police and/or fire department only then summon an emergency response. It is only at this point that average response times begin. This lengthy chain of communication in traditional home security, fire, carbon monoxide and medical alert systems drastically increases the amount of time for an emergency response, likely reducing the chance of the successful apprehension of suspects; fire being put out before massive property damage or loss of life occurs; or emergency medical intervention leading to a successful outcome. This process also adds several layers of equipment and people vulnerable to technical malfunction, miscommunication, or human error. According to The Wall Street Journal's "Fire Countdown Clock": "Fire departments can't control how much time elapses between the start of a fire and when a call is placed to 911, which makes it critical for them to minimize the time they can control."

In summary, home invasions are a serious problem in America and are often predications for other criminal activities including acts of criminal violence. Fire, carbon monoxide and medical protection alert systems are not widely available to some of the most vulnerable members of society due to costly equipment and contracts and current technology employed to make homes more secure has proven very expensive and inefficient. Further, these systems use an outdated and lengthy chain of command—including several electronic communications and people—to finally call for help. According to the New York Times, there are approximately 36 million security systems in the United States with little else available as effective alternatives.

SUMMARY OF THE DISCLOSED TECHNOLOGY

A system, method, and devices for making automated emergency calls in embodiments of the disclosed technology can include at least one base device electrically coupled to a power source with a wireless and/or wired transmission device and interface. "Transmission" is defined as the sending and/or receiving of data. "Interface" is a physical hardware device which connects two different other hardware devices, either via direct electrical connection or wireless transmission of data. At least one battery powered transceiver with a wireless transmission device is also used in embodiments of the disclosed technology. A syncing mechanism copies data previously entered into the system or into one of the devices used (such as into the base station or wireless transceiver, either directly or indirectly via a network interface) between a base station and/or one or more wireless transmission devices. The "base" or "base station" is a device which is powered though electrical current brought from outside the device by way of an outlet fixed to a wall, structure, or building.

At least one sensor (a non-living electrically-coupled device which detects, calculates, or receives stimulus from the outside world) indicates based on stimulus data which causes an emergency condition to be detected or determined. An audio-message generator produces an audio message based on (having a version of, derived from, or as a result of) data presently received from at least one sensor, the sensor being coupled to one of the transceiver or the base device. The audio message generated is sent over a phone interface to a phone network functionally coupled to at least the battery-powered transceiver. The audio message is transmitted via the phone network to an emergency responder upon ("upon" being defined as "as a direct result of, or would not have happened but for the previous event") detecting the emergency condition.

In some embodiments, the audio message is transmitted to the phone network from the base device and a phone-network interface coupled to the base device. In some embodiments, a plurality of transceivers can be used, each in wireless communication with the base device (meaning that each device, at some point before the emergency condition was detected, exchanged data with the base, enabling each to carry out a phone call with audio based on and/or including emergency information stored in the base). The phone network can include POTS (plain old telephone system), VOIP (voice over internet protocol), PSTN (public switched telephone network), and cellular phone networks any or all of which allow audio connectivity to each other between two telephone devices.

Data used in audio of the emergency call to an emergency responder can include presently-determined data and past-entered data. "Presently determined" is data which is only available within one minute of the emergency call open between the caller/calling device and the emergency responder and can include data received before a minute of the emergency call which is part of a longer set of data which is received into this time frame. "Previously entered data", "past data", or the like is data entered before an emergency was detected which is relevant to an emergency situation for a person, or on behalf of a person, who will use systems, methods, and devices of the disclosed technology.

Presently-received data can include any one or a plurality of global positioning system data, smoke detection, emergency button toggle (including the press of a button on a wireless transceiver having a touch screen), wireless connectivity status (is a device currently connected to a particular wireless network or another device via a wireless interface), and electrical power status (is the device presently receiving electrical current from an exterior power source). Further, such presently received data is listed in the detailed description.

The audio message played to the emergency responder is uniquely modified based on content of the presently-received data. Receiving a combination of a certain two pieces of data will result in a different message than from a different combination of a certain two pieces of data. For purposes of this disclosure, "emergency responder" refers to a person or entity responding to an emergency or called party receiving the audio of the phone call with intent to direct others to respond with emergency assistance from fire, police, ambulance, medical assistance, or the like. For purposes of this disclosure, an "emergency" is one applicable to a fire department, police department, ambulance, medical professional, or the like. "Unique" is defined as only repeatable if the exact same triggering conditions (present data and past data) are the same.

Upon using a touch sensor on one of the wireless transceivers, presently received data is gathered (recorded for use with an emergency call) including at least location data, the location data used in the emergency call, and/or time the emergency was detected. Data previously entered into the system can include one, or a combination of data, as well as any or all of the location data, including name, age data, sex data, at least some medical history, at least some information about medications, at least some information about allergies, and language spoken information (e.g. English or Spanish). The data used is previously entered for use in the audio message and based on the type of emergency such that, 1) a first set of data previously entered is sent in the audio message when the emergency type is determined to be fire (including emergencies handled by a fire department including high levels of carbon monoxide), 2) a second set of data previously entered is sent in the audio message when the emergency type is determined to be medical, 3) a third set of data previously entered is sent in the audio message when the emergency type is determined to be intruder.

The audio message is appended with data presently received from at least one sensor during sending of the audio message to said emergency responder. That is, when further data is received from the sensor while the emergency call is transpiring between the calling device (wireless transceiver or base station) and called party (emergency responder), this triggers new audio to place into the phone call. For example, GPS data may be received only after the call is initiated and the location information is thus sent more accurately in this manner during the call.

In some embodiments, only the wireless transceiver(s) (without base station) are used. In some embodiments, all sensors used are on a single wireless transceiver, and in others, they are also on the base station or connected thereto a wired or wireless connection (such as emergency alert buttons, smoke alarms, video cameras, and the like).

In a related method of contacting an emergency responder, an indication is received from at least one first sensor which triggers an emergency condition. Upon receiving this indication, a second sensor receives present information such as location data corresponding to a location of a wireless transmission device with a phone network interface. Past data entered into the wireless transmission device (or another such device, or a base station) is further retrieved and a phone call to an emergency responder is initiated using audio generated on a wireless transmission device or base station which is exhibited through the phone network interface. The audio includes at least some data presently received from at least one sensor and at least some past data.

When a wired base device is used, it syncs (copies the latest data so that both devices have identical data) with the wireless transceiver, and in some embodiments, carries out making the emergency phone call via its own phone network interface or that of one of the wireless transceivers. Other limitations and features described with reference to the system of the disclosed technology above are also applicable to the methods and devices described.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

An emergency call system which generates audio for the emergency call which is played to an emergency responder, is disclosed. The audio is generated based on a combination of data entered into a system prior to the emergency, and data entered into the system during the emergency. Such data is entered by way of sensors or user input and the data which is used during the emergency call depends on the type of call. Devices which can gather the data include bidirectional battery powered transceivers and base stations which have phone network connectivity.

Embodiments of the disclosed technology are described below, with reference to the figures provided.

Figure 1:
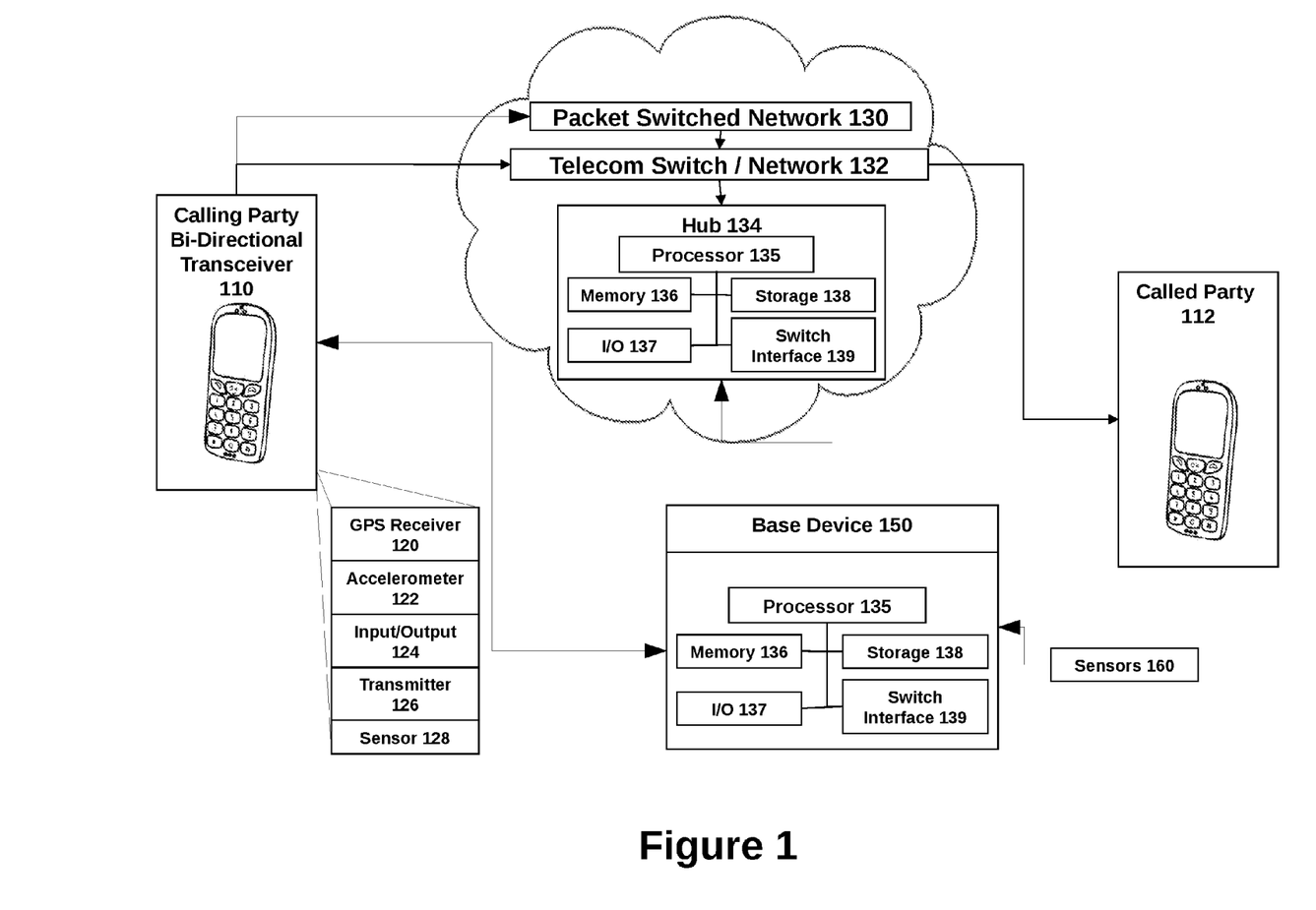
FIG. 1 is a high-level block diagram of devices which are used to carry out embodiments of the disclosed technology.

FIG. 1 shows a high-level block diagram of devices which are used to carry out embodiments of the disclosed technology. A bi-directional battery powered transceiver 110 associated with a calling party is shown, and is representative of one or more such devices, each associated with a caller. A called party 112, in this case, is an emergency responder (see definition in the 'summary). Each has some or all of the following elements: a GPS receiver 120, an accelerometer 122, input/output mechanisms 124, and a transmitter 126. The transceiver 110 also has sensors, such as a touch sensor, temperature sensor, light sensor, proximity sensor, and so forth. Any of these sensors can be used to detect an emergency condition, such as detection of a fire based on light wavelength and temperature. The GPS (global positioning system) receiver 120 is a global positioning system receiver which receives data from global navigation satellites to determine location and reports this location information. The accelerometer 122 measures acceleration and, indirectly, distance, based on time at a rate of acceleration. Other location determination devices which can be used include the Internet protocol (IP address) of one of the bi-directional transceivers 110 and/or 120. Further, location can be determined based on which cellular tower (terrestrial transmitter) is used.

The input/output 124 refers to a keyboard, touch screen, display, and the like, used to receive input and send output to a user of the device. A transmitter 126 enables wireless transmission and receipt of data via a packet-switched network, such as packet-switched network 130. This network, in embodiments, interfaces with a telecommunications switch 132 which routes phone calls and data between two of the bi-directional transceivers 110 and 120. The devices 110 and 112 also communicate directly with a telephone switch or telephone network 132, in embodiments of the disclosed technology. Versions of these data, which include portions thereof, can be transmitted between the devices. A "version" of data is that which has some of the identifying or salient information as understood by a device receiving the information. For example, a GPS receiver 120 may report location data in one format, and a version of these data can be reported via the packet-switched network 130 to a server. Both versions comprise location identifying data, even if the actual data are different in each case.

Referring again to the telecom switch 132, a device and node where data are received and transmitted to another device via electronic or wireless transmission, it is connected to a hub 134, such as operated by an entity controlling the methods of use of the technology disclosed herein. This hub has a processor 135 deciding how the bi-directional transceivers 110 and 112 are matched to each other or send/receive phone calls, as well as forward the phone call to other locations on the telephone network 132. This hub 134 further has memory 136 (volatile or non-volatile) for temporary storage of data, storage 138 for permanent storage of data, and input/output 137 (like the input/output 124) and an interface 139 for connecting via electrical connection to other devices.

Still discussing FIG. 1, the device of the called party, device 112, has stored therein a contact list in volatile or non-volatile memory. A base device 150 or base station, unlike the battery powered transceiver 110, is a wired device 150 with a processor, memory, I/O, storage, and switch interface (as described above). The base station is, in embodiments, powered by way of an electrical outlet from which it receives electric current, the outlet fixed to a structure or dwelling. Sensors 160 send data to the base device 150, such as a smoke alarm which sends data upon detecting smoke, a camera which detects the presence of an intruder, or an emergency call button or even heart rate monitor worn on a person detecting the presence of a medical condition.

Based on detection of an emergency condition, such as by entering same on the calling party transceiver 110, or detected via sensor 128 or 160, an emergency condition is found. Data is entered into the devices (110 or 150) and synced across all devices (such as multiple transceivers 110) in some embodiments. Then, an audio message is generated and sent via a phone network, through the telecom switch or network 132 to an emergency responder 112. The following table shows data which can be entered into/used by the system to detect emergency conditions or used within a phone call to an emergency responder:

TABLE 1

| Item | How Determined | Example |
| --- | --- | --- |
| Type of emergency | How Determined | Medical, Fire, Carbon Monoxide, Burglary (EMS, Fire, Police) |
| Address | User Entered | "Located at home address of: 123 Main Street Clifton, NJ" OR "Located at approximately 500 South Hadley Avenue, Orange, NJ" |
| structure | User Supplied/Past | Three story home |
| Location in home or structure | User Supplied/Past | Where elderly, handicapped, children or people with increased risk of medical emergencies usually are located |
| Location Present | GPS sensor | 40.7127837/ −74.005941300000002 |
| Proximity to "Google places" entities | Server query | Location is near Livingston Bakery and Hess Fuel |
| Name | User Supplied/Past | John Smith |
| Family name for home | User Supplied/Past | "The Smith residence" |
| Age | User Supplied | User supplies DOB and is updated by system automatically so we know as user ages |
| Gender | User Supplied | Male or Female |
| Past significant medical history | User Supplied/Past | Heart Attack, Stroke |
| Current medications | User Supplied/Past | Metformin and Lipitor and/or current medication types e.g. diabetic and cardiovascular medication |
| Known medication allergies | User Supplied/Past | |
| communicate with first responders in English | User Supplied/Past | |
| What time alert was received | Sensor Responding Time | To state the correct time the emergency button, sensor or alarm was triggered: e.g. 8:00 am |

TABLE 1-continued

| Item | How Determined | Example |
| --- | --- | --- |
| Hazards to Responders | User Supplied/Past | Aggressive dog, hidden driveway, etc. |
| Health insurance information | User Supplied/Past | Example; Aetna ID 1234567 |
| Callback number | Supplied upon Call | For user's REAL cell phone and/or VOIP number we call from |
| Disabilities | User supplied/past | Wheelchair, deaf or blind |
| Pets | User supplied/past | Presence of, type and number of pets |

Figure 2:
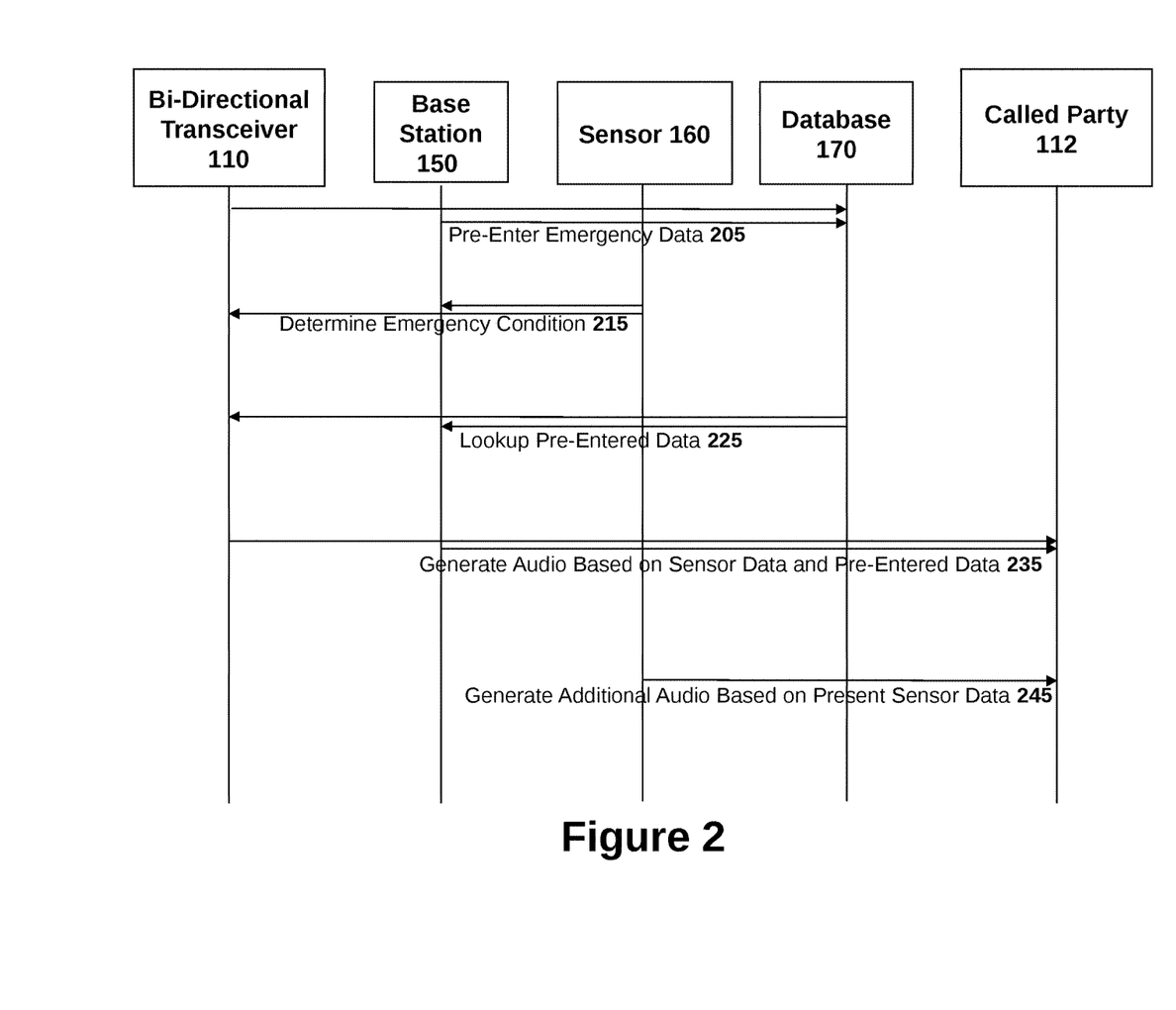
FIG. 2 is a diagram of devices used to carry out steps of the disclosed technology.

FIG. 2 shows a diagram of devices used to carry out steps of the disclosed technology. Here, a bi-directional transceiver 110 or a base station 150 receives data which is entered in step 205 before an actual emergency has been determined. This data is stored in a database 170 residing on one or more of the bi-directional transceiver 110, base device 150, or another device located at a dwelling of the emergency or at another location off-site (defined as at least 1 kilometer away) from the place of the emergency. Such entered data can be synchronized ("synced") between any of these devices. Then, when an emergency condition is detected in step 215, by way of either a sensor 160 reported data which is out of bounds from a non-emergency condition (examples: window detected open, carbon monoxide levels too high, movement in a video camera indicating a likely break-in), then this data is sent to a transceiver 110 or base device 150. The sensor 160 can reside on the transceiver 110, base device 150, or be electrically coupled (sends data to) one of these devices.

With the emergency condition detected, the data stored in the database 170 is retrieved in step 225 and send to a device which will generate audio and make a phone call based on this data in step 235. This can be either the bi-directional transceiver 110 or the base device. Recall that there can be more than one of these devices 110 or 150 used in systems of the disclosed technology. Thus, the same device which received the sensor data in step 215 and determined there is an emergency can make the phone call in step 235, or a different one of such devices 110 or 150 can generate the audio in step 235. The audio generated is sent to a called party 112 who is an emergency responder via audio, or in some cases, via written message. In step 245, additional audio is sent based on present sensor data. That is, once a call is made or communication is ongoing between the calling device (110 or 150) and the called party 112, this communication can be supplemented with later determined data. For example, accurate location data from a GPS may be determined only after the emergency condition was detected in step 215 and the call made in step 235. This additional location data is then sent in step 245.

Figure 3:
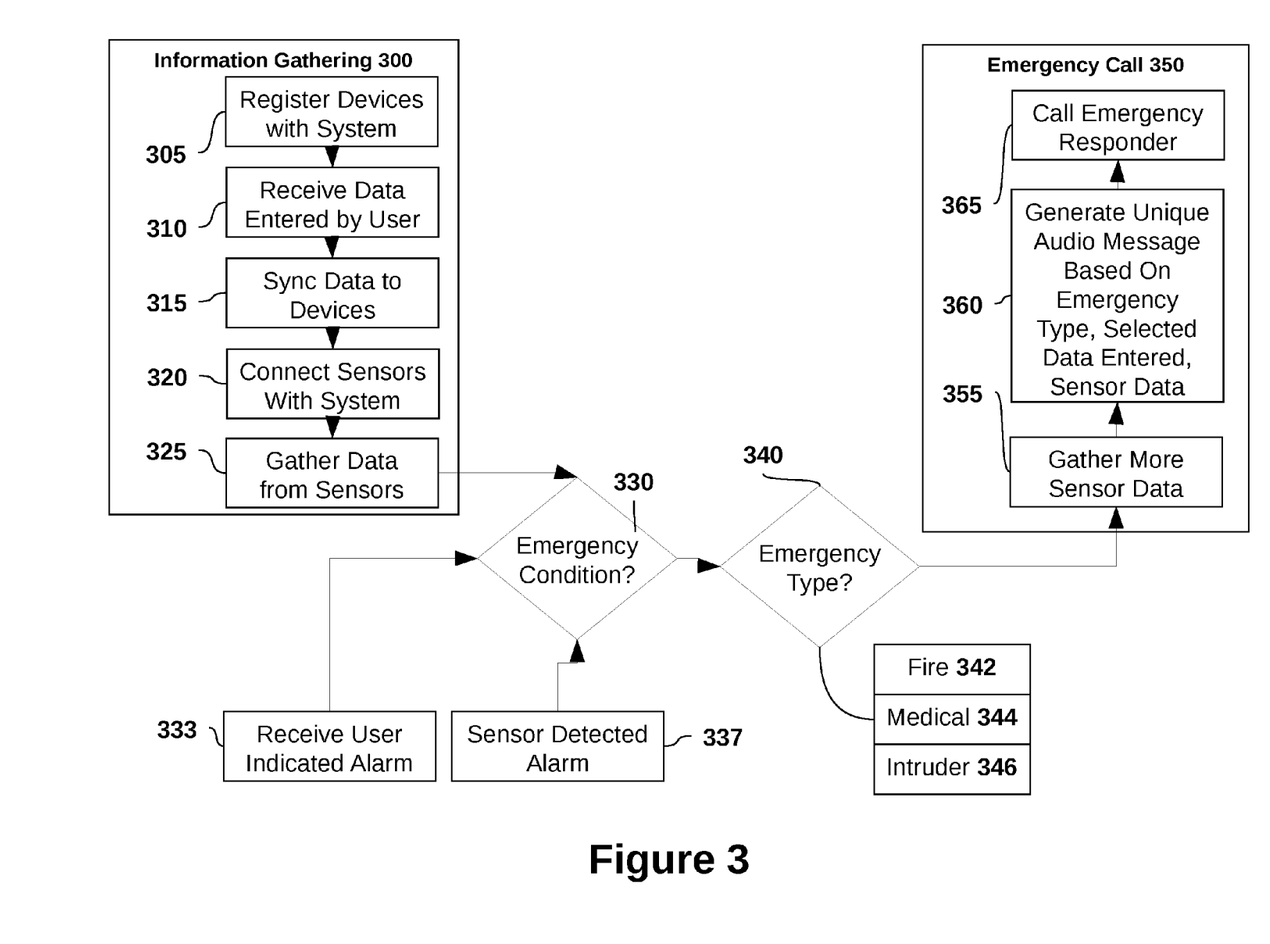
FIG. 3 is a high-level flow chart depicting how methods of the disclosed technology are carried out.

FIG. 3 is a high-level flow chart depicting how methods of the disclosed technology are carried out. Here, block 300 generally refers to an information gathering stage before an emergency call is made. Block 350 refers to steps during the emergency call. In step 305 devices are registered with a system allowing them to communicate with each other with at least some emergency data in the future. Further, devices registered with the system can include sensors, phone call making devices, and devices which can process the data from the sensors and generate audio messages in a phone call. Data is entered into one or more of these devices (such as shown in Table 1, above) in step 310 and then the data is synchronized between the devices in step 315. As such, in case of emergency, any of the devices, such as one of a plurality of bidirectional battery powered transceivers, can generate an emergency call and has all the data entered stored within, despite losing network connectivity with any or all other devices registered with the system in step 300. Sensors are then connected or registered with the system in step 320. These sensors report information which is used to determine a fire, medical, or police emergency which generally include dangerous conditions of some form. Any sensor which reports data which can be used to determine that a condition is dangerous or potentially dangerous can be used including those reporting on the state or location of a physical object, those reporting on gases in the air, those reporting on acceleration, pressure, breaking of a field or electrical circuit, and the like.

Based on the above, an emergency condition is detected in step 330. This step is repeated (not shown) until an actual emergency is detected. The emergency is detected in one of two ways: a user indicated alarm (step 333) or a sensor detected alarm (step 337). Depending on the sensors reporting and the out of bounds nature thereof, and/or a selection by the user, the emergency type is determined in step 340 including one or more of a fire emergency 342 (a type of emergency primarily directed to a fire department), a medical emergency 344, or an intruder 346. Then an emergency call is made based on pre-entered data received in step 310, presently gathered sensor data from step 325, the emergency type detected in step 340, and/or more data gathered in step 355 after the emergency condition is indicated. Based on one, some, or all of these inputs step 360 is carried out with a unique audio message (or text message) which is used to call an emergency responder over a telephone network and provide the information.

Examples of audio and audio templates used in embodiments of the disclosed technology follow.

A medical emergency 344 made through a base device 150.

"This is an emergency medical communication from the system located at [ADDRESS TEXT/ADDRESS AUDIO], for [FIRST NAME TEXT/AUDIO+LAST NAME TEXT/AUDIO] who is a/an [AGE] year old [GENDER] with a history of [PRE-EXISTING CONDITION DATA] OR statement of "no known significant medical history to the device". [FIRST NAME TEXT/AUDIO+LAST NAME TEXT/AUDIO] takes [MEDICATION TRIAGE 1-10 TEXT/AUDIO] OR "statement of no known current medication to the device". [FIRST NAME+LAST NAME] ONLY UNDERSTANDS [X LANGUAGE]. [FIRST NAME TEXT/AUDIO+LAST NAME TEXT/AUDIO] is located on the [FLOOR OF HOME OR STRUCTURE]. [FIRST NAME TEXT/AUDIO+LAST NAME TEXT/AUDIO] has known medication allergy to: [MEDICATION ALLERGY 1-10 TEXT/AUDIO]. [This alert was received at <TIME OF ALARM> and is known to have [HAZARD TO FIRST REPONDERS 1], [HAZARD TO FIRST RESPONDERS 2]."

Medical Alert Type of Sensor 160 with Call Made through Medical Alert Sensor's Connection to Bi-directional Transceiver 112 which Makes the Phone call "This is an emergency medical communication from the Home-Arm system located at approximately (phone/connected device derived location) for [FIRST NAME TEXT/AUDIO+LAST NAME TEXT/AUDIO] who is a/an [AGE] year old [GENDER] with a history of [PRE-EXISTING CONDITION TRIAGE 1-10 TEXT/AUDIO] OR statement of no known significant medical history to the device. [FIRST NAME TEXT/AUDIO+LAST NAME TEXT/AUDIO] takes [MEDICATION TRIAGE 1-10 TEXT/AUDIO] OR statement of no known current medication to the device. [FIRST NAME TEXT/AUDIO+LAST NAME TEXT/AUDIO] has known medication allergy to: [MEDICATION ALLERGY 1-10 TEXT/AUDIO]. [FIRST NAME+LAST NAME] ONLY UNDERSTANDS [X LANGUAGE]. [This alert was received at <TIME OF ALARM>"]

Fire Sensor 160 Leading to a Fire 342 Emergency

"This is an emergency fire communication from the Home-Arm system located at [ADDRESS TEXT/AUDIO], for the [LAST NAME TEXT/AUDIO] household where smoke was detected by the <FLOOR AND/OR ROOM FIRE DETECTION SENSOR>. This alert was received at <TIME OF ALARM>. There are typically [NUMBER OF OCCUPANTS ROUTINELY INSIDE THE HOME], including <NUMBER OF CHILDREN> located on the [FLOOR OF CHILDREN] and [NUMBER OF PETS] and is known to have [HAZARD TO FIRST REPONDERS 1], [HAZARD TO FIRST RESPONDERS 2]. Currently the system assesses it is likely there are <NUMBER OF INDIVIDUALS IN OR NEAR THE STRUCTURE BASED ON CONNECTED DEVICE ANALYSIS>."

A Window/Door Sensor 160 Leading to an Intruder Emergency 346

"This is an emergency security communication from the system located at [ADDRESS TEXT/AUDIO], for the [LAST NAME TEXT/AUDIO] household where the <WINDOW AND/OR DOOR SENSOR> in/on the [FLOOR AND LOCATION] was activated at <TIME OF ALARM>. There are typically [NUMBER OF OCCUPANTS ROUTINELY INSIDE THE HOME OR STRUCTURE], including [NUMBER OF CHILDREN] located on the [FLOOR OF CHILDREN] and [NUMBER OF PETS] and is known to have [HAZARD TO FIRST REPONDERS 1], [HAZARD TO FIRST RESPONDERS 2]. Currently the system assesses it is likely there are (NUMBER OF INDIVIDUALS IN OR NEAR THE STRUCTURE BASED ON CONNECTED DEVICE ANALYSIS)."

Figure 4:
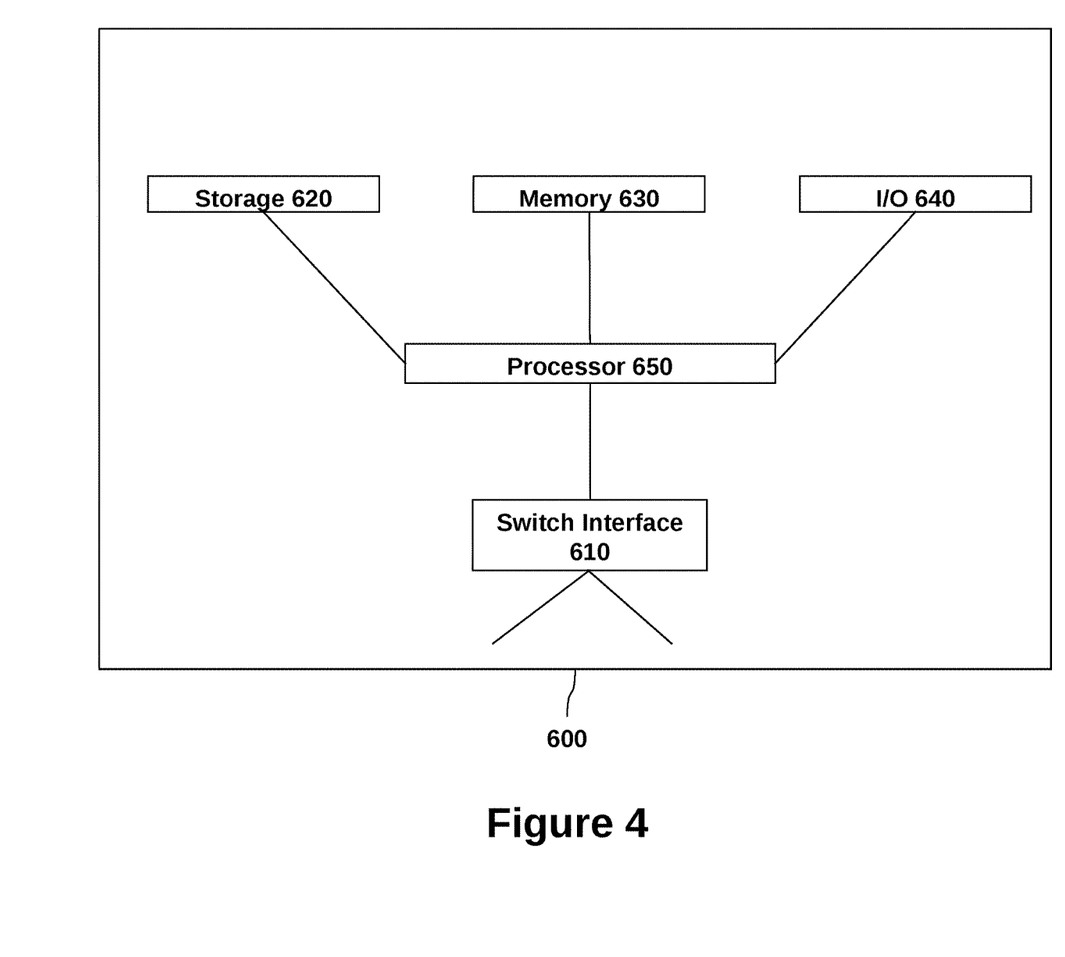
FIG. 4 shows a high-level block diagram of a device that may be used to carry out the disclosed technology.

FIG. 4 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630 when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640 representing devices, which allow for user interaction with a computer (e.g., display, keyboard, mouse, speakers, buttons, etc.). One skilled in the art will recognize that an implementation of an actual device will contain other components as well, and that FIG. 4 is a high-level representation of some of the components of such a device, for illustrative purposes. It should also be understood by one skilled in the art that the method and devices depicted in FIGS. 1 through 3 may be implemented on a device such as is shown in FIG. 4.

Further, it should be understood that all subject matter disclosed herein is directed at, and should be read only on, statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A system for making automated emergency calls, comprising:
   at least two transceivers each with a wireless transmission device, forming part of a single local area network;
   a syncing mechanism configured, in case of an emergency condition, to copy data previously entered into one of said at least two transceivers in said system from said one of said at least two transceivers to at least one other of said at least two transceivers;
   at least one sensor coupled to at least one of said at least two transceivers, said at least one sensor detecting said emergency condition;
   an audio message generator forming part of said single local area network, said audio message generator generating an audio message based on data received from said at least one sensor at a time of said detecting said emergency condition, said audio message providing information related to said emergency condition; and
   an interface to a phone network functionally coupled to at least one of said at least two transceivers;
   wherein said audio message is transmitted via said phone network and played to an emergency responder upon detecting said emergency condition,
   wherein said audio message includes a first set of data when said detected emergency condition is a fire, a second set of data when said detected emergency condition is a medical emergency, and a third set of data when said detected emergency condition is an intruder emergency.

2. The system of claim 1, wherein each of said at least two transceivers includes a said audio message generator.

3. The system of claim 1, wherein said data received from said at least one sensor at a time of said detecting said emergency condition is at least two of:
   global positioning system data;
   smoke detection;
   emergency button toggle;
   wireless connectivity status; and
   electrical power status.

4. The system of claim 3, wherein said information relating to said emergency condition included in said audio message is based on said at least two said data received from said at least one sensor at a time of said detecting said emergency condition.

5. The system of claim 1, wherein said sensor is a touch sensor on said transceiver, and upon use of said sensor, said data received from said at least one sensor includes at least location data which is used in said audio message.

6. The system of claim 1, wherein data previously entered into said system comprises each of location data, name, age data, sex data, at least some medical history, at least some information about medications, at least some information about allergies, and language information.

7. The system of claim 6, wherein each of said first set of data, said second set of data, and said third set of data, includes a selection of some data items of said data previously entered based on said detected emergency condition.

8. The system of claim 1, wherein, during sending of said audio message to said emergency responder, said audio message is appended with data received from said at least one sensor at said time of said detecting said emergency condition.

9. A system for making automated emergency calls, comprising:
   at least two transceivers each with a wireless transmission device, forming part of a single local area network;
   a syncing mechanism configured, in case of an emergency condition, to copy data previously entered into said system from one of said at least two transceivers to a remote device via wireless transmission;
   at least one sensor coupled to at least one of said at least two transceivers, said at least one sensor detecting said emergency condition;
   an audio message generator forming part of said single local area network, said audio message generator generating an audio message based on data presently received from said at least one sensor, said audio message providing information related to said emergency condition; and
   an interface to a phone network functionally coupled to at least one of said at least two transceivers;
   wherein said audio message is transmitted and played via said phone network to an emergency responder upon detecting said emergency condition, and
   wherein said audio message includes a first set of data when said detected emergency condition is a fire, a second set of data when said detected emergency condition is a medical emergency, and a third set of data when said detected emergency condition is an intruder emergency.

10. A method of contacting an emergency responder, comprising the steps of:
    receiving an indication to a device on a local area netowrk from at least one first sensor forming part of said local area network, said indication triggering an emergency condition;
    upon receiving said indication, receiving, via a second sensor forming part of said local area network, at least location data corresponding to a location of a wireless transmission device, said wireless transmission device comprising a phone network interface;
    retrieving past data entered into said wireless transmission device;
    initiating a phone call to an emergency responder on said wireless transmission device, and generating audio played into said phone call on said wireless transmission device which is exhibited over said phone network interface, said generated audio including at least some data presently received from said at least one sensor and at least some past data
    wherein said generated audio includes a first set of data when said emergency condition is a fire, a second set of data when said emergency condition is a medical emergency, and a third set of data when said emergency condition is an intruder emergency.

11. The method of claim 10, wherein said wireless transmission device with a phone network interface is a plurality of transceivers, each forming part of said single local area network, and wherein said initiating said phone call and said generating said audio is carried out by one of said plurality of transceivers, while said receiving said indication from at least one sensor of said emergency condition is carried out by another of said plurality of transceivers.

12. The system of claim 9, wherein said some data presently received is at least two of:
global positioning system data;
smoke detection;
emergency button toggle;
wireless connectivity status; and
electrical power status.

13. The system of claim 12, wherein information relating to said emergency condition included in said audio played into said phone call is based on said at least two said presently received data.

14. The system of claim 10, wherein said first sensor is a touch sensor on said wireless transmission device, and upon use of said first sensor, said data presently received includes at least location data which is used in said audio.

15. The system of claim 10, wherein past data previously entered into said wireless transmission device comprises each of location data, name, age data, sex data, at least some medical history, at least some information about medications, at least some information about allergies, and language information.

16. The system of claim 15, wherein each of said first set of data, said second set of data, and said third set of data, includes a selection of some data items of said data previously entered based on a detected type of said emergency condition.

17. The system of claim 16, wherein, during playing of said audio into said phone call, said audio message is appended with data presently received from said at least one sensor.

* * * * *